United States Patent
Bitto et al.

(10) Patent No.: US 7,350,422 B2
(45) Date of Patent: *Apr. 1, 2008

(54) VIBRATION-TYPE MEASUREMENT PICKUP FOR MEASURING MEDIA FLOWING IN TWO MEDIUM-LINES, AND INLINE MEASURING DEVICE HAVING SUCH A PICKUP

(75) Inventors: Ennio Bitto, Aesch (CH); Holger Bernhard, Grenzach-Wyhlen (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/589,835

(22) Filed: Oct. 31, 2006

(65) Prior Publication Data

US 2007/0095152 A1    May 3, 2007

Related U.S. Application Data

(63) Continuation of application No. 11/167,081, filed on Jun. 28, 2005, now Pat. No. 7,127,952.

(60) Provisional application No. 60/590,902, filed on Jul. 26, 2004.

(30) Foreign Application Priority Data

Jul. 23, 2004    (DE)   ...................... 10 2004 035 971

(51) Int. Cl.
    *G01F 1/84*      (2006.01)
(52) U.S. Cl. ................................................. 73/861.355
(58) Field of Classification Search ............................... 73/861.355–861.357
See application file for complete search history.

(56) References Cited

U.S. PATENT DOCUMENTS 5,090,253 A    2/1992    Kolpak (Continued)

FOREIGN PATENT DOCUMENTS

DE    35 03 841 A1    8/1986

(Continued)

*Primary Examiner*—Harshad Patel
(74) *Attorney, Agent, or Firm*—Bacon & Thomas, PLLC

(57) ABSTRACT

A measurement pickup includes at least four measuring tubes for conveying media to be measured. Each measuring tube has a first in-/outlet end and a second in-/outlet end. During operation, the measuring tubes vibrate, at least at times, especially simultaneously. The measurement pickup further includes an electromechanical exciter mechanism causing the measuring tube to vibrate, as well as a sensor arrangement reacting at least to local vibrations of the measuring tubes for producing at least one measurement signal influenced by vibrations of the measuring tubes. Of the at least four measuring tubes, two measuring tubes are, at least at times, inserted into the course of a first medium-line such that each of these two measuring tubes simultaneously conveys, in each case, a partial volume of a medium flowing through the first medium line, and two other measuring tubes of the at least four measuring tubes are, at least at times, inserted into the course of a second medium line such that each of these two measuring tubes simultaneous conveys, in each case, a partial volume of a second medium flowing through the second medium line. The measurement pickup can thus, on the one hand, have two media flowing through it, which differ measurably from one another in at least one physical property, for example mass flow rate, medium density and/or medium temperature, while having, on the other hand, despite the different media, a good zero-point stability.

29 Claims, 8 Drawing Sheets

U.S. PATENT DOCUMENTS

| | | |
|---|---|---|
| 5,540,106 A | 7/1996 | Lew |
| 5,969,264 A | 10/1999 | Rivkin |
| 7,127,952 B2 * | 10/2006 | Bitto et al. ............ 73/861.355 |
| 2005/0252307 A1 | 11/2005 | Andresen |

FOREIGN PATENT DOCUMENTS

| | | |
|---|---|---|
| EP | 0 329 700 B1 | 8/1989 |
| EP | 1 260 798 A1 | 11/2002 |
| EP | 1 271 111 A1 | 1/2003 |
| EP | 1 296 128 A1 | 3/2003 |

* cited by examiner

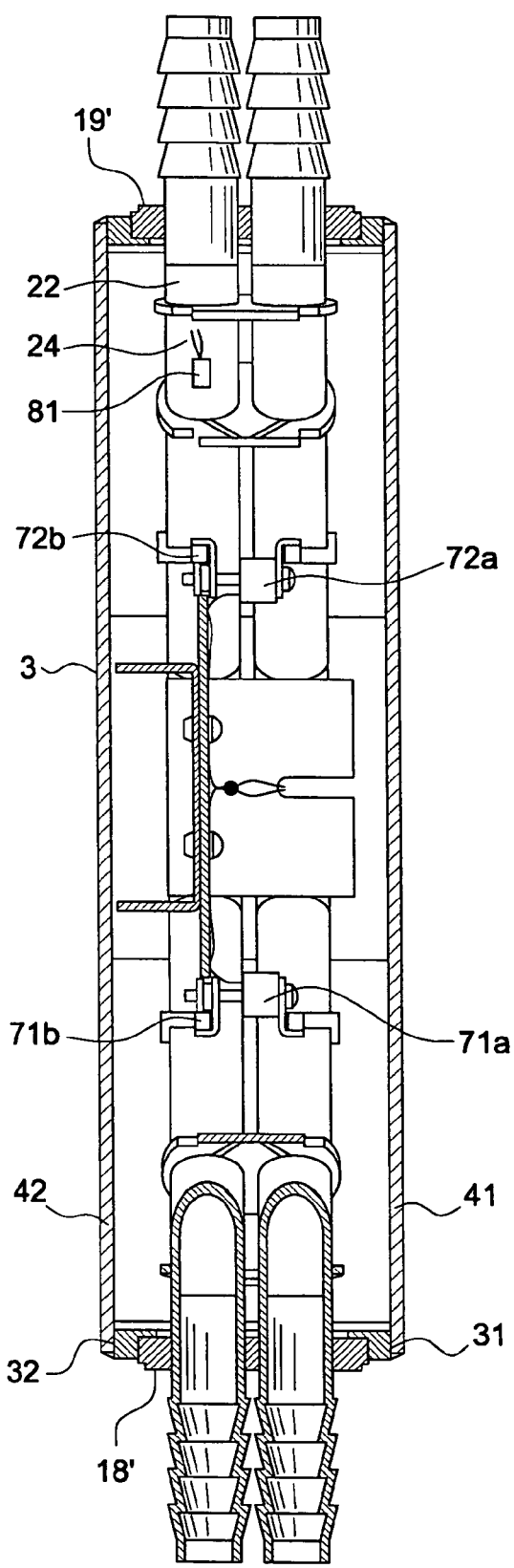
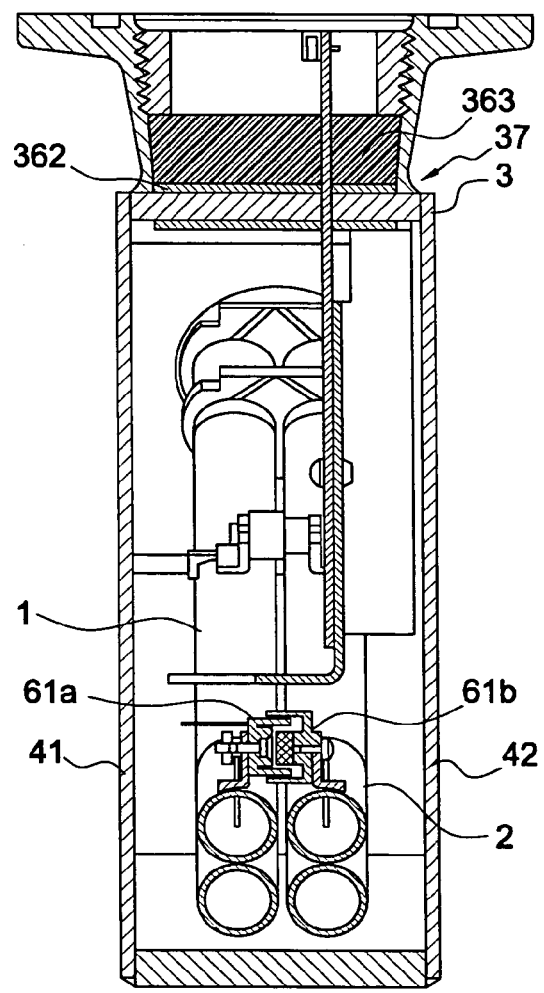
FIG. 4
FIG. 5

VIBRATION-TYPE MEASUREMENT PICKUP FOR MEASURING MEDIA FLOWING IN TWO MEDIUM-LINES, AND INLINE MEASURING DEVICE HAVING SUCH A PICKUP

This application is a Continuation of U.S. application Ser. No. 11/167,081 filed on Jun. 28, 2005 now U.S. Pat. No. 7,127,952, which is a nonprovisional of U.S. Provisional Application No. 60/590,902 filed on Jul. 26, 2004.

FIELD OF THE INVENTION

The invention relates to a measurement pickup for measuring media flowing in two, especially separate, lines, as well as to an inline measuring device having such a measurement pickup.

For measuring, or registering, a process variable of media flowing in lines, especially pipelines, especially for registering flow-dynamic and/or Theological, measured variables, often such inline measuring devices are applied, which utilize a vibration-type, i.e. vibratory, measurement pickup inserted into the course of the medium-conveying pipe, tube or hose line, and a measuring and operating circuit connected thereto, to cause, in the medium flowing through the pickup during operation, reaction forces, such as e.g. Coriolis forces corresponding to the mass flow rate, inertial forces corresponding to the density or frictional forces corresponding to the viscosity and to produce, derived from these forces, a measurement signal representing the particular mass flow rate, viscosity and/or density of the medium. The measurement pickup is, in such case, connected e.g. by means of flanges, medium-tightly, especially pressure-tightly, and mostly also permanently, with the line conveying the medium.

For operating the measurement pickup, especially also for the further processing or evaluating of the at least one measurement signal, such is, furthermore, connected with an appropriate measuring device electronics. In the case of inline measuring devices of the described kind, the measuring device electronics is, in turn, usually connected, via an attached data-transmission system, with other measuring devices and/or with an appropriate central computer, to which it sends the measured-value signals, e.g. via a digital data bus. Serving as data-transmission systems in such case are often, especially serial, bus systems, such as e.g. PROFI-BUS-PA, FOUNDATION FIELDBUS, as well as the corresponding transmission protocols. The central computer can process the transmitted measured-value signals and visualize them as corresponding measurement results e.g. on monitors and/or convert them into control signals for corresponding actuators, such as e.g. magnetic valves, electro-motors of pumps, etc. To accommodate the measuring device electronics, such inline measuring devices further include an electronics housing, which, as e.g. proposed in WO-A 00/36379, can be arranged remotely from the measurement pickup and connected therewith only over a flexible cable or which, as e.g. shown in EP-A 1 296 128 or WO-A 02/099363, is arranged directly on the measurement pickup, especially on a measurement pickup housing which houses the measurement pickup.

Especially, such inline measuring devices having a vibration-type measurement pickup are suited for the direct measuring of a mass flow rate balance, especially a mass flow rate difference, of two simultaneously flowing media conveyed in different medium-lines. Such balance measurements serve mostly to monitor the content of and/or the lack of leaks in, a container with connected system of lines by simultaneous measurement of the incoming flow of medium and the outgoing flow of medium. Corresponding cases of application for such balance measurements are to be found, for example, in the area of medical technology, especially in the areas of blood transfusion or dialysis, or in the area of paint technology, especially in the mixing of colors. Suitable balance measuring systems, which measure balances of two mass flows using inline measuring devices of the described kind, especially Coriolis mass flow measuring devices, are described e.g. in EP-A 441 328, EP-A 244 692, U.S. Pat. No. 6,457,372, U.S. Pat. No. 6,138,517 or U.S. Pat. No. 4,252,028.

For conveying the medium, the vibration-type measurement pickups disclosed therein all include two measuring tubes held in a frame of, for example, tubular or box shape. Each of these tubes is caused to vibrate—driven by an electromechanical exciter mechanism—for producing, during operation, the above-mentioned reaction forces. One of the measuring tubes is, in each case, intended for insertion into the course of a first medium-line conveying the, in the above sense, incoming medium, while the other measuring tube is provided for the, in the above sense, outgoing medium conveyed in a second medium-line. For registering, especially inlet-end and outlet-end, vibrations of the measuring tubes, the measurement pickups each have, furthermore, a physical-electrical sensor arrangement reacting to movements of the oscillating measuring tubes.

In the case of Coriolis mass flow measuring devices, the measurement of the mass flow rate of a flowing medium rests, in known manner, on allowing the medium to flow through each of the measuring tubes, which oscillate during operation laterally to an oscillation axis, whereby Coriolis forces are induced in such medium. These, in turn, cause inlet and outlet regions of the relevant tube to oscillate with phases which are shifted relative to one another, with the size of these phase shifts being a measure of the instantaneous mass flow rate in the measuring tube. The oscillations of each of the measuring tubes are, therefore, locally registered and converted into oscillation measurement signals by means of two oscillation sensors of the aforementioned sensor arrangement displaced from one another along the relevant measuring tube. The mass flow rate can then be derived from the relative phase shift.

In the case of balance measuring systems of the described kind, the measurement pickups have during operation, at least at times, two media simultaneously flowing through them and of character differing in at least one physical property, for example mass flow rate, density, viscosity and/or temperature. As a result of this, the measuring tubes can, during operation of the inline measuring device, significantly deviate from one another as regards their mechanical characteristics of oscillation, for example as regards the instantaneous oscillation amplitudes and/or the instantaneous oscillation frequencies, although they are constructed nominally practically identically. This can, as a result of the mechanical coupling between the individual measuring tubes, lead to considerable errors in the measured balance of the two medium streams, for example, thus, the measured mass flow rate difference, as discussed, for example, also in the already mentioned U.S. Pat. No. 6,457,372. For preventing or eliminating such measurement errors typical for balance measuring systems of the described kind, it is, furthermore, proposed in U.S. Pat. No. 6,457,372, to determine the oscillation amplitudes of the two, differently oscillating measuring tubes always separately, and, based on the individually measured oscillation amplitudes of each of the measuring tubes, to perform a suitable correction of the measured phase differences.

However, such a predominantly calculations-based compensation, which essentially only subsequently eliminates the measurement errors caused by the different oscillation amplitudes, leads, on the one hand, to an increased technical complexity as regards the construction of the exciter mechanism and sensor arrangement, as well as also regarding the construction of the measuring device electronics processing the measurement signals, as well as regards the hardware and also the software. Furthermore, it has been found, that the imbalances unavoidably associated with the non-uniform changes of the oscillation characteristics of the measuring tubes can lead to significant problems as regards the zero-point stability of the measurement pickup, which then are scarcely manageable any more by compensation measures limited essentially to measurement signal processing.

BACKGROUND OF THE INVENTION

Considering the above-mentioned disadvantages in the case of balance measurement systems of the described kind, an object of the invention is to provide a vibration-type measurement pickup, which can, on the one hand, have flowing through it simultaneously two media, which differ measurably from on another in at least one physical property, for example the mass flow rate, the density of the medium and/or the temperature of the medium, and which, on the other hand, nevertheless has a good zero-point stability.

To achieve this object, the invention resides in a measurement pickup suited for the, especially simultaneous and/or differential, measurement of media flowing in two medium-lines. The measurement pickup includes, for this purpose, at least four measuring tubes for conveying media to be measured. Each of these measuring tubes has a first, inlet end and a second, outlet end, and is made to vibrate, especially simultaneously with the others, at least at times, during operation. The measurement pickup further includes an electromechanical, especially electrodynamic, exciter mechanism for effecting vibration of the measuring tubes, together with a sensor arrangement reacting at least to local vibrations of the measuring tubes for producing at least one measurement signal influenced by vibrations of the measuring tube. In such case, of the at least four measuring tubes, a first measuring tube and a second measuring tube are, at least at times, inserted into the course of a first medium-line in a manner such that each of these two measuring tubes simultaneously conveys a partial volume of a medium flowing through the first medium-line, and, of the at least four measuring tubes, a third measuring tube and a fourth measuring tube are, at least at times, inserted into the course of a second medium-line in a manner such that each of these two measuring tubes simultaneously conveys a partial volume of a medium flowing through the second medium-line.

Additionally, the invention resides in an inline measuring device, which includes the aforementioned measurement pickup, for determining a mass flow rate of a first medium flowing in a first medium-line and a mass flow rate of a second medium flowing in a second medium-line and/or for determining a balance between the first mass flow rate of the first medium and the mass flow rate of the second medium.

A basic idea of the invention is that, on the one hand, the first medium instantaneously located in the measuring tubes, as well as the second medium instantaneously located in the measuring tubes, are each split into partial volumes which are essentially the same size, and that, on the other hand, the two partial volumes of the first medium, as well as also the two partial volumes of the second medium are each arranged, among themselves, symmetrically with respect to an imaginary centerline of mass, or centerline, of the measurement pickup. Stated differently, such concerns dividing the mass flow of the first medium to be measured and the mass flow of the second medium to be measured, in each case, into two essentially equally large flow portions and conducting the flow portions so through the measurement pickup, that, even in the case of media of physical properties deviating from one another, an essentially symmetric distribution of the relevant physical properties, such as e.g. mass flow rate, density, viscosity, temperature, etc. is maintained with respect to the aforementioned centerline.

An advantage of the measurement pickup of the invention is, among other things, that, in spite of the fact that it can be manufactured comparatively cost-favorably, it nevertheless exhibits a very high accuracy of measurement, especially also a very high zero-point stability.

BRIEF DESCRIPTION OF THE DRAWINGS

The invention and further advantageous embodiments will now be explained in greater detail on the basis of the figures of the drawing, in which several variants of the measurement pickup of the invention are presented. Functionally equal parts are provided in the separate figures with the same reference characters; however, reference characters are only repeated in subsequent figures, when such appears helpful.

FIG. 4 shows the measurement pickup of FIG. 2 in section taken on the cutting plane A-A of FIG. 3, representing a bottom view of FIG. 2, now, however, with completed housing;

FIG. 5 shows the measurement pickup of FIG. 2 in section taken on cutting plane B-B of FIG. 3, representing an end view of FIG. 2, again with completed housing;

DESCRIPTION OF THE PREFERRED EMBODIMENT

Figure 1:
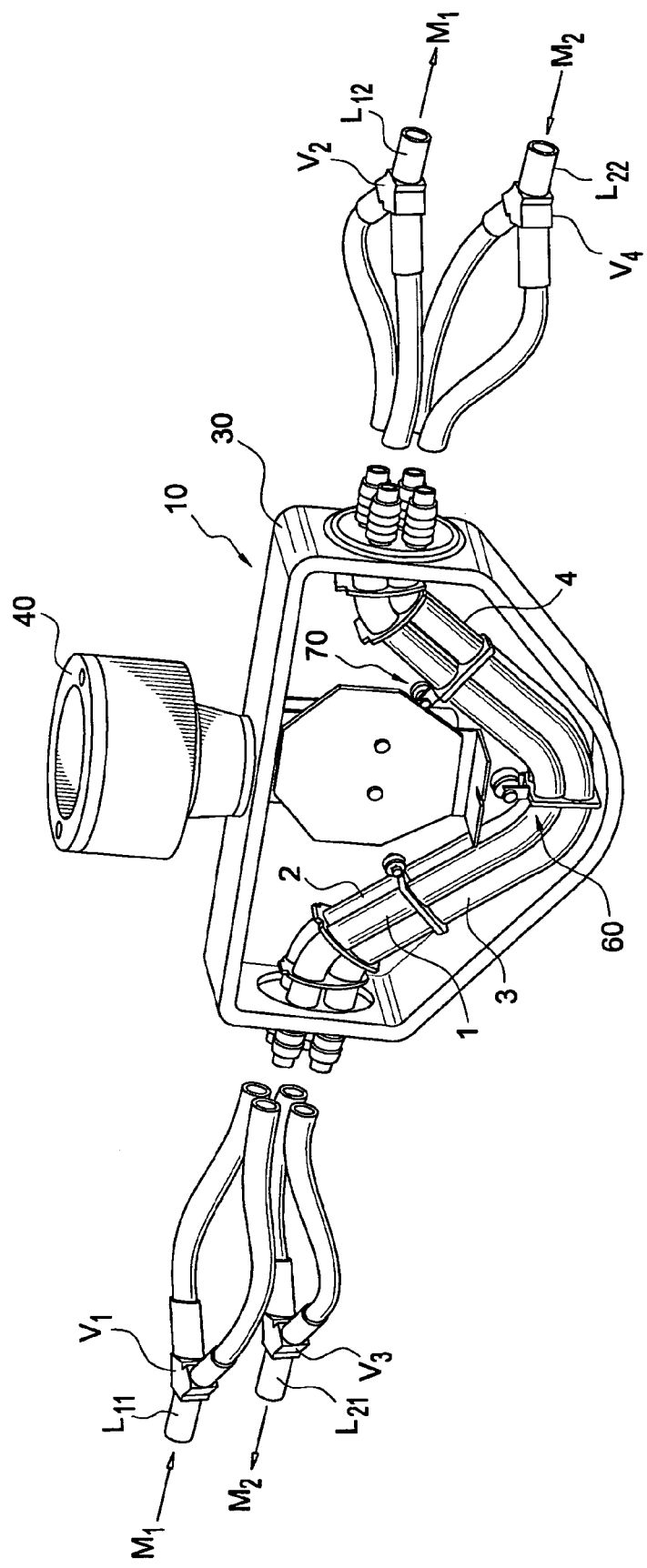
FIG. 1 shows, perspectively, an inline measuring device with vibration-type measurement pickup for measuring media conveyed in two medium-lines.

In a first embodiment of the measurement pickup of the invention, the first in-/outlet end of each of the first and second measuring tubes is connected during operation with a first distributor element and the second in-/outlet end of each of the first and second measuring tubes is connected with a second distributor element. In the same way, also the first in-/outlet end of each of the third and fourth measuring tubes is connected during operation with a third distributor element, and the second in-/outlet end of each of the third and fourth measuring tubes is connected during operation with a fourth distributor element. Beyond this, the first distributor element is connected to a line segment of the first medium-line conveying a medium to the measurement pickup, and the second distributor element is connected to a line segment of the first medium-line conveying a medium away from the measurement pickup, and the third distributor element is connected to a line segment of the second medium-line conveying a medium to the measurement pickup, and the fourth distributor element is connected to a line segment conveying a medium away from the measurement pickup.

In a second embodiment of the measurement pickup of the invention, the exciter mechanism includes an, especially differentially acting, electrodynamic, oscillation exciter, which acts on the measuring tubes via an exciter coil essentially rigidly coupled with the first and/or the third measuring tube(s) and a plunger armature plunging into these coils and essentially rigidly coupled with the second and/or the fourth measuring tube(s).

In a third embodiment of the measurement pickup of the invention, the oscillation exciter is located above a common, local center of gravity of all four measuring tubes, which lies in an imaginary, cross-sectional plane passing through the location of installation of the oscillation exciter.

In a fourth embodiment of the measurement pickup of the invention, the oscillation exciter is so arranged in the measurement pickup and attached to the measuring tubes, that an exciting force introduced into the measuring tubes by the oscillation exciter acts, in each case, essentially in a common, local center of gravity of the first and third measuring tubes and in a common, local center of gravity of the second and fourth measuring tubes, with the two centers of gravity lying in an imaginary cross sectional plane passing through the location of installation of the oscillation exciter.

In a fifth embodiment of the measurement pickup of the invention, the sensor arrangement is constructed as an, especially differentially acting, electrodynamic sensor arrangement, which includes at least two sensor coils of essentially the same construction as the exciter coil of the exciter mechanism, as well as two plunger armatures of essentially the same construction as the plunger armature of the sensor mechanism.

In a sixth embodiment of the measurement pickup of the invention, the sensor arrangement includes exactly two sensor coils, as well as exactly two plunger armatures therefor.

In a seventh embodiment of the invention, the measurement pickup further includes a first support system for the oscillatable holding of the measuring tubes, with the first support system being fixed on at least one, first in-/outlet end of one of the four measuring tubes and on at least a second in-/outlet end of one of the four measuring tubes.

In an eighth embodiment of the measurement pickup of the invention, the first support system is fixed on the first and on the second in-/outlet ends of at least two of the four, especially of each of the four, measuring tubes.

In a ninth embodiment of the measurement pickup of the invention, the measuring tubes are so formed and arranged in the measurement pickup, that a minimum lateral separation between the first and the second measuring tubes is essentially greater than a maximum lateral separation between the first and the third measuring tubes an/or than a maximum lateral separation between the second and the fourth measuring tubes.

In a tenth embodiment of the measurement pickup of the invention, the measuring tubes are so formed and arranged in the measurement pickup that they extend, at least sectionally, essentially parallel to one another.

In an eleventh embodiment of the invention, the measuring tubes are so formed and arranged in the measurement pickup that the first and the third measuring tubes contact one another at least sectionally and that the second and the fourth measuring tubes contact one another at least sectionally.

In a twelfth embodiment of the measurement pickup of the invention, the first and third measuring tubes are, for the formation of a first measuring tube combination, essentially rigidly coupled together, at least pointwise, in each case away from their first and second in-/outlet ends, and the second and fourth measuring tubes are, for the formation of a second measuring tube combination, essentially rigidly coupled together, at least pointwise, in each case away from their first and second in-/outlet ends.

In a thirteenth embodiment of the measurement pickup of the invention, the first and the third measuring tubes are essentially rigidly coupled together at least sectionally, in each case away from their first and second in-/outlet ends, and the second and fourth measuring tubes are essentially rigidly coupled together at least sectionally flushly, in each case away from their first and second in-/outlet ends.

In a fourteenth embodiment of the measurement pickup of the invention, the first and the third measuring tubes are soldered, especially hard soldered, or brazed, and/or welded together, with the formation of a connection seam, in each case away from their first and second in-/outlet ends, and the second and the fourth measuring tubes are soldered, especially hard soldered, or brazed, and/or welded together, with the formation of a connection seam, in each case away from their first and second in-/outlet ends.

In a fifteenth embodiment of the measurement pickup of the invention, a first oscillation system formed by the first and the third measuring tubes, and a second oscillation system formed by the second and the fourth measuring tubes, have essentially equal eigenfrequencies.

In a sixteenth embodiment of the measurement pickup of the invention, the measuring tubes oscillate during operation with essentially the same oscillation frequency, especially at a natural eigenfrequency of the first and second oscillation systems.

In a seventeenth embodiment of the measurement pickup of the invention, the first and the second measuring tube oscillate at least at times with essentially opposite phase relative to one another, and the third and the fourth measuring tubes oscillate at least at times with essentially opposite phase relative to one another.

In an eighteenth embodiment of the measurement pickup of the invention, the vibrations executed by the measuring tubes during operation are, at least at times, bending oscillations, in each case about an axis imaginarily connecting the first and, in each case, the associated second in-/outlet ends or an imaginary axis parallel to such.

In a nineteenth embodiment of the measurement pickup of the invention, each of the four measuring tubes has a centerline imaginarily connecting its first in-/outlet end and its second in-/outlet end.

In a twentieth embodiment of the measurement pickup of the invention, the measuring tubes are so formed and arranged in the measurement pickup, that at least two of the four imaginary centerlines run in a common, imaginary, especially planar, cutting surface of the measurement pickup.

In a twenty-first embodiment of the measurement pickup of the invention, the measuring tubes are so formed and arranged in the measurement pickup that the four imaginary center lines are distributed on two imaginary, essentially mutually parallel, especially planar, cutting surfaces, of the measurement pickup.

In a twenty-second embodiment of the measurement pickup of the invention, the measuring tubes are so formed and arranged in the measurement pickup, that the four imaginary center lines are distributed on four imaginary, essentially mutually parallel, especially planar, cutting surfaces of the measurement pickup.

In a twenty-third embodiment of the measurement pickup of the invention, the measuring tubes are so formed and arranged in the measurement pickup, that all four imaginary center lines run in a common, imaginary, especially planar, cutting surface of the measurement pickup.

In a twenty-fourth embodiment of the measurement pickup of the invention, the four measuring tubes are essentially straight.

In a twenty-fifth embodiment of the invention, the four measuring tubes are essentially equally curved, especially in V- or U-shape.

In a twenty-sixth embodiment of the measurement pickup of the invention, the four measuring tubes are curved essentially in V-shape.

In a twenty-seventh embodiment of the measurement pickup of the invention, the four measuring tubes are essentially identically formed.

In a twenty-eighth embodiment of the measurement pickup of the invention, the partial volumes of the medium of the first medium-line have, in the first and second measuring tubes, a common flow direction, which, at least at times is oppositely directed to a common flow direction of the partial volumes of the medium of the second medium-line in the third and fourth measuring tubes.

In a twenty-ninth embodiment of the measurement pickup of the invention, the partial volumes of the medium of the first medium-line have, in the first and second measuring tubes, a common flow direction, which, at least at times, is equally directed to a common flow direction of the partial volumes of the medium of the second medium-line in the third and fourth measuring tubes.

In a thirtieth embodiment of the measurement pickup of the invention, the first support system is held, especially oscillatably, by an external, second support system, especially a second support system housing the measurement pickup, and/or by at least one of the connected medium-lines.

In a thirty-first embodiment of the measurement pickup of the invention, the measurement pickup has at least one temperature sensor thermally coupled with at least one of the measuring tubes and reacting to changes of its measuring tube temperature.

FIG. 1 shows an inline measuring device for the, especially simultaneous, measurement of two media conveyed separately from one another. The inline measuring device includes therefor a physical-electrical measurement pickup, or transducer, accommodated in a first support system 30, especially a support system including a pickup housing. Additionally, the inline measuring device includes a measuring and operating electronics electrically connected with the measurement pickup 10, especially an electronics accommodated in an electronics housing 40. The inline measuring device serves especially for determining a balance between a first medium $M_1$ at least temporarily flowing in a first medium-line and a second medium $M_2$ at least temporarily flowing in a second medium-line, especially a difference between, and/or a sum of, the mass flow rates of the two media or also an average density and/or viscosity of the two media, etc.. In the case of the medium $M_1$, it can be, for example a medium conveyed to a container, or to a reactor, for example a fluid, a paste and/or a powder, while the second medium $M_2$ can be, for example, a fluid removed from the same container or reactor. It is to be noted additionally at this point that the two media $M_1$, $M_2$ can be either essentially identical in chemistry or their chemistries can differ from one another. Equally, the two media can be in equal or different forms in comparison to one another, even with respect to their instantaneous physical states, for example their respective flow velocities, their respective Reynolds numbers or their respective pressures, etc. and/or with respect to their instantaneous physical properties, for example their respective densities, their respective viscosities or their respective temperatures, etc..

In the case of the measurement pickup 10 used for the balance measurement, such is a vibration-type measurement-transducer, of which various embodiments are shown in FIGS. 2 to 9. Such measurement transducers serve, as already mentioned above, for producing reaction forces, e.g. mass flow rate-dependent Coriolis forces, density-dependent inertial forces and/or viscosity-dependent frictional forces, in a medium flowing through vibrating, especially with bending oscillations, measuring tubes, such forces being registerable by sensor and thus reacting measurably on the particular measuring tube and on the oscillations executed thereby. Derived from such reaction forces, most often produced by selectively excited, wanted oscillations of the measuring tubes and at least indirectly measurable via changes of oscillation amplitudes, oscillation frequencies and/or phase positions, e.g. a mass flow rate, a density and/or a viscosity of the medium flowing in the particular measuring tube can be determined in manner known per se to those skilled in the art.

Figure 2:
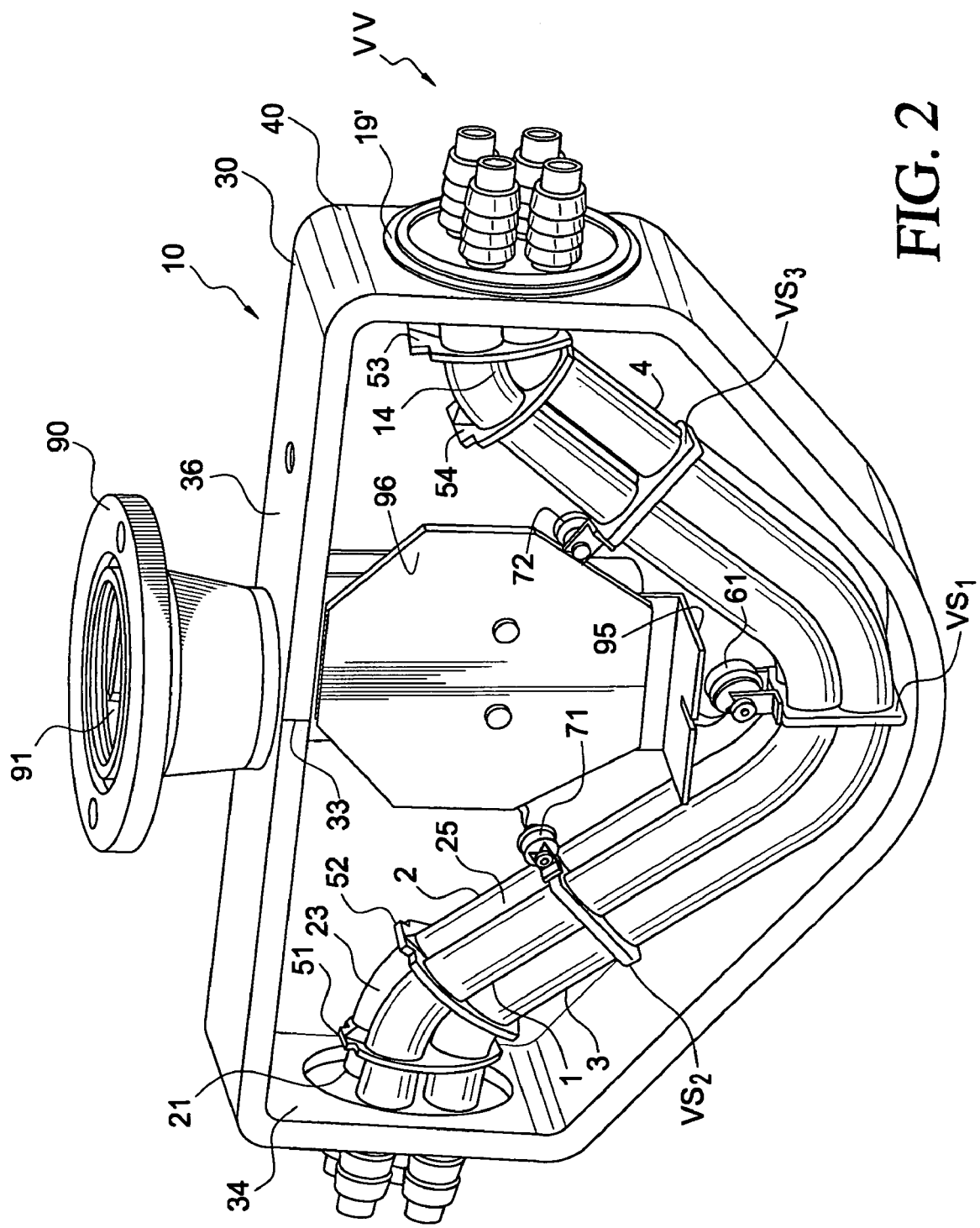
FIG. 2 shows, perspectively, mechanical details of a first variant of a vibration-type measurement pickup suited for an inline measuring device according to FIG. 1, without completed housing.

As shown in FIGS. 1 and 2, the measurement pickup 10 of the invention includes therefor a first measuring tube 1 and a second measuring tube 2, which two measuring tubes 1, 2 serve for conveying the first medium $M_1$, as well as a third measuring tube 3 and a fourth measuring tube 4, which two measuring tubes 3, 4 serve for, in each case, conveying the second medium $M_2$. In operation of the measurement pickup, the first and the second measuring tubes 1, 2 are, to this end, each connected on the inlet end with a first line segment $L_{11}$ conveying a medium to the measurement pickup and on the outlet end with a second line segment $L_{12}$ of the first medium-line conveying a medium away from the measurement pickup. Equally, the third measuring tube 3 and the fourth measuring tube 4 are connected for the measurement, in each case, on the inlet end to a first line segment $L_{21}$ conveying medium to the measurement pickup and in each case on the outlet end to a second line segment $L_{22}$ of the second medium line conveying medium away from the measurement pickup.

In an embodiment of the invention, as also indicated in FIGS. 1 and 2, a first in-/outlet end of the first measuring tube 1 and a first in-/outlet end of the second measuring tube 2 open during operation each into a first distributor element $V_1$, and a second in-/outlet end of the first measuring tube 1 and a second in-/outlet end of the second measuring tube 2 open during operation each into a second distributor element $V_2$. Additionally, the first distributor element $V_1$ is, at least at times, connected with the first line segment $L_{11}$ of the first medium-line and the second distributor element $V_2$ is connected, at least at times, with the second line segment $L_{12}$ of the first medium line 1. The two measuring tubes 1, 2, the distributor elements, and the two line segments $L_{11}$, $L_{12}$ of the first medium line are thus connected together such that the two measuring tubes 1, 2 convey, during operation, two, as much as possible equally large, flow portions of the first medium in parallel, or, said differently, that each of these two measuring tubes 1, 2 simultaneously conveys a partial volume of the medium $M_1$ flowing in the first medium-line. Analogously, a first in-/outlet end of the third measuring tube 3 and a first in-/outlet end of the fourth measuring tube 4 each opens during operation into a third distributor element $V_3$, and a second in-/outlet end of the third measuring tube 3 and a second in-/outlet end of the fourth measuring tube 4 opens, during operation, each into a fourth distributor element $V_4$. Additionally, also the third distributor element $V_3$ is, at least at times, connected with the first line segment $L_{21}$ of the second medium-line and the fourth distributor element $V_4$ is connected, at least at times, with the second line segment $L_{22}$ of the second medium-line. Consequently, during operation of the measurement pickup, each of these two measuring tubes 3, 4 conveys, at least at times, simultaneously, each a partial volume of the medium $M_2$ flowing in the second medium-line.

As is apparent from the above description, the first medium $M_1$ flowing in the two measuring tubes 1, 2 can, during operation of the inline measuring device, be caused to flow in any manner, especially also in a manner independent of the second medium $M_2$ flowing in the measuring tubes 3, 4. Correspondingly, especially also the mass flow rates of the two media $M_1$, $M_2$ can differ from one another; especially, the medium $M_1$ in the first and second measuring tubes 1, 2 can e.g. pass through these also in a common direction of flow, which, as indicated in FIG. 1, is opposite to an instantaneous, common direction of flow of the medium $M_2$ in the third and fourth measuring tubes 3, 4. Equally, however, the mass flow rate of one of the two media $M_1$, $M_2$ can be practically zero, while the mass flow rate of the correspondingly other of the two media, $M_1$ or $M_2$, as the case may be, is different from zero. Beyond this, it is also possible to allow the two media $M_1$, $M_2$ to flow through the measuring tubes with the same directions of flow, for example for the purpose of directly measuring the total flow rate of the two media $M_1$, $M_2$.

The measuring tubes of the measurement pickup of the invention can, for example, be of stainless steel, with, in one embodiment of the invention, the stainless steel being that with the European material number 1.4539, which corresponds to the American designation 904 L. However, the measuring tubes can also be manufactured of other steels or other materials familiar to those skilled in the art, such as e.g. titanium, zirconium, tantalum or alloys thereof. Additionally, also plastics, glass, ceramics or the like can be used as material for the measuring tubes. According to a further embodiment of the invention, the measuring tubes, especially such as are one-piece in form, can, for the minimizing of manufacturing costs, be formed essentially identically, at least in pairs. Additionally, the measuring tubes are advantageously so arranged in the measurement pickup that they extend, at least sectionally, parallel to one another; preferably, such is the case over the entire measuring tube length.

The first measuring tube 1 is, in the case of the first variant of the measurement pickup 10 shown in FIGS. 2 to 5, bent essentially in V-shape, especially symmetrically with reference to a first line of symmetry. The here correspondingly likewise essentially V-shaped, second measuring tube 2 is likewise bent symmetrically to a second line of symmetry. In like manner, also the measuring tubes 3, 4 running parallel to the two measuring tubes are each bent symmetrically in V-shape. Stated differently, each of the measuring tubes has at least one centerline extending centrally therein, essentially of V-shape, and imaginarily connecting its first in-/outlet end and its second in-/outlet end. An advantage of measuring tubes curved in essentially V-shape is that, besides their easy manufacturability, among other things, they also exhibit a comparatively high stability against deformation forces possibly acting in the direction of flow. It should, however, already be mentioned here that, instead of the measuring tubes 1, 2, 3, 4 bent, by way of example, in V-shape in the first and second variants, also other tube shapes can be selected. For example, in the case of vibration-type measurement pickups, also measuring tubes curved in a tube plane in U-shape, OMEGA-shape, or triangle-shape have proven themselves to be especially successful. Other tube shapes in principle suited for the four measuring tubes are disclosed in U.S. Pat. No. 6,711,958, U.S. Pat. No. 6,457,372, U.S. Pat. No. 6,450,042, U.S. Pat. No. 5,796,011, U.S. Pat. No. 5,301,557, U.S. Pat. No. 4,876,898 or U.S. Pat. No. 4,895,031. Equally as well, the four measuring tubes can, however, also be in essentially straight form, as, in fact, shown in FIG. 6 illustrating a third variant of the measurement pickup of the invention.

As is evident from FIG. 2, the measuring tube 1 in the first variant of the measurement pickup of the invention has an essentially straight, first in-/outlet segment 11 and an essentially straight, second in-/outlet segment 12. Furthermore, measuring tube 1 exhibits a first in-/outlet, arcuate segment 13 connected with the in-/outlet tube segment 11, a second in-/outlet arcuate segment 14 connected with the second in-/outlet tube segment 12, an essentially straight, first middle tube segment 15 connected with the first in-/outlet arcuate segment 13, an essentially straight, second middle tube segment 16 connected with the second in-/outlet arcuate segment 14, and a vertex arcuate segment 17 connected with the middle tube segments 15, 16. The measuring tube 2 is, as already indicated, essentially identical in form to the measuring tube 1, i.e. it has likewise a straight, first in-/outlet tube segment 21, a straight, second in-/outlet tube segment 22, a first in-/outlet, arcuate segment 23 connected with the in-/outlet tube segment 21, a second in-/outlet arcuate segment 24 connected with the second in-/outlet tube segment 22, an essentially straight, first middle tube segment 25 connected with the first in-/outlet arcuate segment 23, an essentially straight, second middle tube segment 26 connected with the second in-/outlet arcuate segment 24, and a vertex arcuate segment 27 connected with the middle tube segments 25, 26. An imaginary in-/outlet axis A2 of the second measuring tube 2 aligning with the two in-/outlet segments 21, 22 runs, moreover, essentially parallel to an imaginary in-/outlet axis A1 of the first measuring tube 1, which imaginarily connects its two in-/outlet segments 11, 12. In analogous manner thereto, also the third measuring tube 3 is formed by a straight, first in-/outlet tube segment 31, a straight, second in-/outlet tube segment 32, a first in-/outlet, arcuate segment 33 connected with the in-/outlet tube segment 31, a second in-/outlet arcuate segment 34 connected with the second in-/outlet tube segment 32, an essentially straight, first middle tube segment 35 connected with the first in-/outlet arcuate segment 33, an essentially straight, second middle tube segment 36 connected with the second in-/outlet arcuate segment 34, and a vertex arcuate segment 37 connected with the middle tube segments 35, 36 and the fourth measuring tube 4 is formed by a straight, first in-/outlet tube segment 41, a straight, second in-/outlet tube segment 42, a first in-/outlet, arcuate segment 43 connected with the in-/outlet tube segment 41, a second in-/outlet arcuate segment 44 connected with the second in-/outlet tube segment 42, an essentially straight, first middle tube segment 45 connected with the first in-/outlet arcuate segment 43, an essentially straight, second middle tube segment 46 connected with the second in-/outlet arcuate segment 44, and a vertex arcuate segment 47 connected with the middle tube segments 45, 46. In the example of an embodiment shown in FIG. 2, the in-/outlet arcuate segments 13, 14, 23, 24, as well as the vertex arcs 17, 27 are formed essentially as circular arcs.

Figure 6:
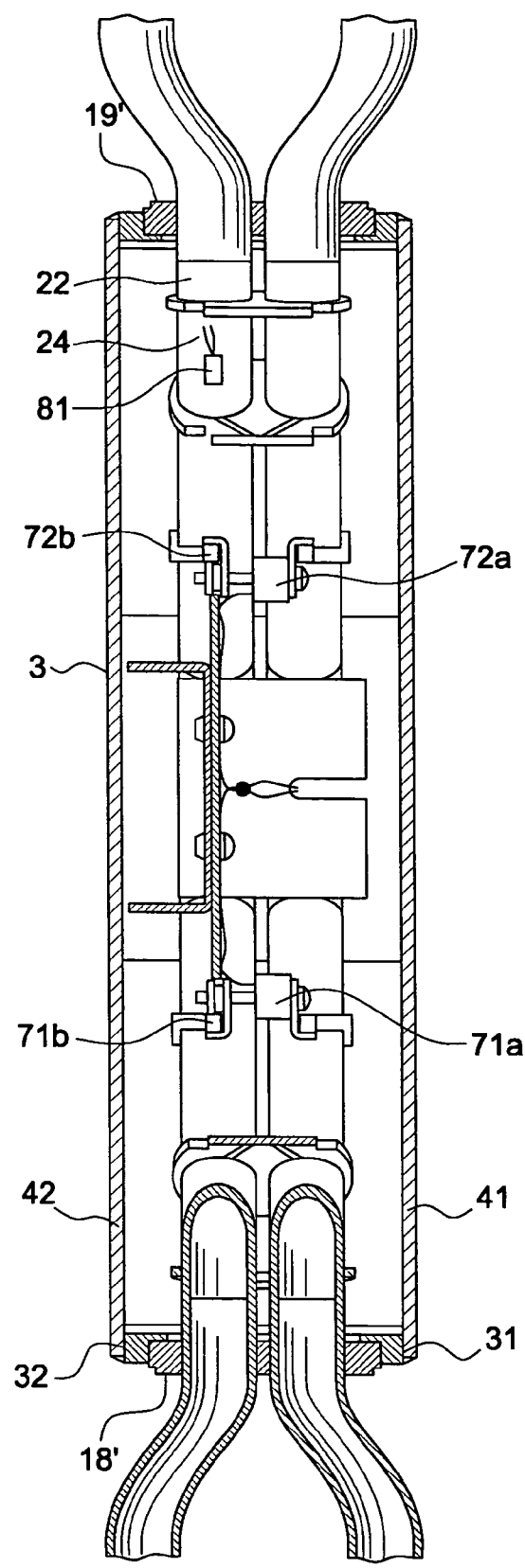
FIG. 6 shows a sectional view of a measurement pickup modified, in comparison to the measurement pickup of FIG. 2, only with respect to its connections for medium-lines.

As shown in FIGS. 2 to 6, the in-/outlet tube segments 11, 12, 21, 22, 31, 32, 41, 42 of the measuring tubes are additionally each so arranged and fixed on their ends in a frame serving as a largely bending- and twisting-stiff support system 30, that the measuring tubes are held, to a sufficient degree, oscillatably therein. The support system 30 of the first variant of the measurement pickup is, as evident upon consideration of FIGS. 1 and 4, practically integrated into the pickup housing, while in the second and third variants of the measurement pickup it is more in the form of a massive base, or support, plate. As shown in FIG. 2 or 6, the two in-/outlet tube segments 11, 12, 21, 22, 31, 32, 41, 42 of each of the measuring tubes 1, 2, 3, 4 can, in this case, be directed, for example, such that they align with one another. However, there is also the possibility of forming the four measuring tubes and orienting them with respect to one another such that each of the corresponding in-/outlet segments pierce the support system 30 on one and the same side; compare, in this connection, also FIGS. 6 and 7.

For inserting the measurement pickup 10 into the medium-lines, extensions of the respective in-/outlet tube segments 11, 12, 21, 22 of the measuring tubes 1, 2, 3, 4 each contain connection mechanisms VV, such as e.g. nozzles with an external, or an internal, thread, flanges or clamping mechanisms, such as e.g. are commercially available under the registered mark Triclamp. For the case in which the line segments to be connected with the measuring tube 1 and/or the measuring tube 2 are hose lines, the connection mechanisms can be embodied in appropriate manner as hose connection nozzles, as illustrated in each of FIGS. 1, 2, 3, 4, onto which the appropriate line segments $L_{11}$, $L_{12}$, $L_{21}$ or $L_{22}$ of the appropriate medium-lines can be pushed on. Additionally, the connection mechanisms can be directed to align with about constant spacing with the appropriate measuring tubes, or even, as indicated in FIG. 6, lead away from the measurement pickup with greater mutual separations, as compared to the separations between the measuring tubes.

The support system 30 of the first variant of the measurement pickup of the invention includes a comparatively flat and even, first in-/outlet frame segment 31, an equally flat and even, second in-/outlet frame segment 35, as well as, connecting the in-/outlet frame segments 31, 32, a spanning frame segment 33, in which an electrical conduit 34 is pressure-tightly fixed (only visible in FIG. 4). The spanning frame segment 33, likewise flat and even in the illustrated example of an embodiment, forms right angles with the first and second in-/outlet frame segments 31, 32. The support system 30 includes in the first variant, additionally, a planar, first extension frame element 34, which is attached to the first in-/outlet frame segment 31 at an angle greater than 90 deg—in the illustrated example of an embodiment, the angle is about 120 deg. The support system 30 includes, finally, a curved vertex frame segment 35 merging into the first extension frame segment 35 and planar second extension frame element 36 attached to the second in-/outlet frame segment 32 at the mentioned angle and also merging into the vertex frame segment 35. As in the case of the measuring tubes 1, 2, 3, 4, the support system 30 can likewise be formed as one piece and can be produced, for example, from a flat piece of high-grade steel of constant breadth and thickness, with a front surface 301 and a back surface 302, by appropriate bending and welding of the ends; compare the seam 303.

Figure 3:
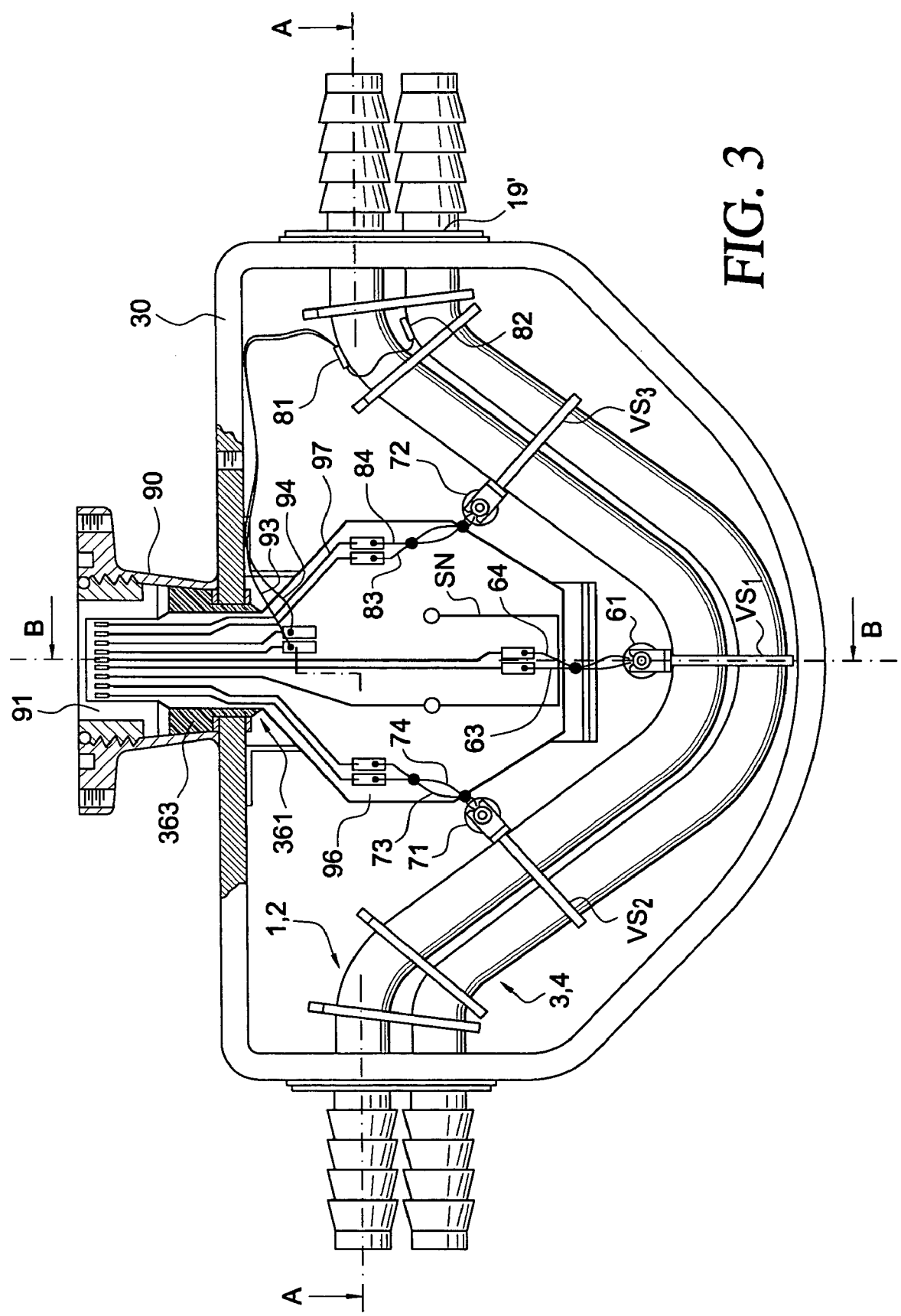
FIG. 3 shows an elevational view of the measurement pickup of FIG. 2, again without completed housing, however with added electrical details.

Serving, in the illustrated example of an embodiment, for fixing the measuring tubes 1, 2, 3, 4 in the support system 30 formed in essentially box- or frame-shape for the first variant of the measurement pickup are an, especially plate-shaped, or diaphragm-like, first fixing element, for example of steel, which is mechanically connected, especially welded or brazed, with at least one of the first in-/outlet segments 11, 21, 31, 41 and with the first in-/outlet frame segment 31, and an, especially membrane-like, second fixing element, which is mechanically connected, especially welded or brazed, with at least one of the second in-/outlet segments 12,22, 32,42 and with the second in-/outlet frame segment 32. In the example of an embodiment shown in FIGS. 2 and 3, the first fixing element is plate-shaped and, on the one hand, pushed onto the first in-/outlet segment 11, 21, 31, 41 of the measuring tubes 1, 2, 3, 4 and mechanically connected with at least one of the in-/outlet segments 11, 21, 31, 41, and, on the other hand, connected, especially welded or brazed, with the in-/outlet frame segment 31, while covering a mounting opening therein. In corresponding manner, the measuring tubes 1, 2, 3, 4 can be secured to the second in-/outlet frame segment 32 by means of a second fixing plate pushed onto the second in-/outlet segments 12, 22, 32, 42 and mechanically connected with at least one of the two. The support system 30 of the first variant can, as schematically illustrated in FIGS. 3 or 4, be completed additionally by a left side wall 37 and a right side wall 38 to form a pickup housing encasing, especially medium-tightly, the measuring tubes. The two side walls 37, 38 are, in such case, in the form of essentially planar sheet, e.g. of stainless steel, which, fitted to the contour of the open frame and welded on the front surface 301 and the back surface, complement the open frame to complete the pickup housing. An example of steel for the support system 30 is stainless steel, European material number 1.4301, which corresponds to the American designation 304.

As already indicated above, in the case of the measurement pickup of the invention, the reaction forces required for the measurement are brought-about in each medium to be measured by causing the measuring tubes to oscillate. For this purpose, the measurement pickup includes additionally an exciter mechanism 60 acting on the measuring tubes 1, 2, 3, 4. Such mechanism 60 serves to cause each of the measuring tubes to execute wanted oscillations, at least within a defined range during operation, in each case suited for the actual measurement by being sufficiently large for the production and registering of the aforementioned reaction forces in the fluid. Moreover, the measurement pickup has a sensor arrangement 70, which serves for producing at least one, first oscillation measurement signal $S_{71}$ influenced by the measured variable to be registered, especially, however, also a corresponding oscillation measurement signal $S_{72}$.

For driving the measuring tubes, the exciter mechanism 60 correspondingly has at least one electromechanical, especially electrodynamic, oscillation exciter 61. This serves for converting an electric, exciter power $P_{exc}$, fed from a corresponding measuring and operating circuit e.g. of the above-mentioned Coriolis mass flow meter, into, e.g. pulsating or harmonic, exciting forces $F_{exc}$, which symmetrically, thus simultaneously, in phase, or in opposite phase, act on measuring tubes 1 and 2, and, if necessary, also on measuring tubes 3 and 4, to produce the mutually opposite-phase oscillations of the measuring tubes 1, 2 and/or 3, 4, as the case may be. The exciting forces $F_{exc}$ can be adjusted, in manner known per se to those skilled in the art, e.g. by means of a current and/or voltage control circuit provided in the already mentioned measuring and operating electronics, with respect to their amplitude and, e.g. by means of a phase-locked loop (PLL) likewise provided in the measuring and operating electronics, with respect to their frequency; compare, in this regard, also U.S. Pat. No. 4,801,897. It is to be mentioned here that the measuring and operating circuit (not shown) can be accommodated in the electronics housing 40, which, as shown in FIG. 1, is mounted in the manner known to those skilled in the art, for example, practically directly on the measurement pickup, or it can, if required, also be arranged remotely therefrom. As shown in FIGS. 2 and 3 by way of example, a first part 61*a* of the exciter 61 is fixed to the vertex arcuate segment 17 of the measuring tube 1 in the region of its above-mentioned line of symmetry, and a second part 61*b* of the exciter 61 is fixed to the vertex arcuate segment 27 of the measuring tube 2 in the region of its above-mentioned line of symmetry; compare FIG. 4.

In a further embodiment, the exciter 61 is, as also schematically illustrated in the examples of embodiments shown here, an electrodynamic exciter acting simultaneously, especially differentially, on the two measuring tubes 1, 2, with the first part 61*a* being an exciter coil and the second part 61*b* a permanent magnet, plunging armature, which can interact with the coil arrangement by plunging movements relative thereto.

The sensor arrangement 70 serving for registering oscillations, especially the bending oscillations, of the measuring tubes vibrating during operation includes, in the measurement pickup shown in FIG. 2, an inlet end, especially electrodynamic, first oscillation sensor 71 and an outlet end, especially electrodynamic, second oscillation sensor 72, which two oscillation sensors 71, 72 react to movements of the measuring tubes 1, 2, especially their lateral deflections and/or deformations, to deliver, respectively, the first and second oscillation signals $S_{71}, S_{72}$. The oscillation sensors 71, 72 are, in this case, fixed to the measuring tubes 1, 2 essentially symmetrically with reference to the above-discussed lines of symmetry of the measuring tubes 1, 2.

Additionally, the two oscillation sensors 71, 72. are preferably of equal construction. Beyond this, they can also be constructed essentially equally to the oscillation exciter 61. In the example of an embodiment shown in FIGS. 2 and 3, a first part 71*a* of the oscillation sensor 71 is fixed on the middle tube segment 15 of the measuring tube 1 and a second part 71*b* to middle tube segment 25 of the measuring tube 2; compare FIG. 3. A first part 72*a* of the oscillation sensor 72 is fixed to the middle tube segment 16 of the measuring tube 1 and a second part 72*b* to the middle tube segment 26 of the measuring tube 2; compare FIG. 3. According to an embodiment of the measurement pickup of the invention, the oscillation sensors 71, 72 are differentially acting (thus directly registering a distance- or velocity-difference between the two measuring tubes), electrodynamic, velocity sensors, i.e. the parts 71*a*, 72*a* are each an exciter coil and the parts 71*b*, 72*b* are each permanent magnet, plunging armatures, which can plunge into their associated exciter coils. The oscillation sensors 71, 72 can also be, for example, distance- or acceleration-sensors.

In the case of the measurement pickups shown here, the measurement signals delivered by the sensor arrangement 70 correspond to the two oscillation signals $S_{71}, S_{72}$, with a relative phase position of the two oscillation signals being dependent on the instantaneous mass flow rates in the measuring tubes 1, 2, as well as also 3, 4, and a respective signal frequency being dependent on the instantaneous densities of the media flowing in the measuring tubes. An advantage of the use of differentially acting, oscillation exciters and oscillation sensors in association with the oscillation systems formed in the above-described manner is additionally that also such measuring and operating electronics can be used for operating the measurement pickup of the invention as have already been used, for example, in conventional Coriolis mass flow/density measuring devices. A further advantage, moreover, is that, in using such conventional measuring and operating electronics for the illustrated measurement pickups, alone because of the simultaneous conveyance of the two media to be measured, through the measuring tubes, the difference of the two mass flow rates can be directly registered, so that also the measurement signal processing and evaluation methods implemented in conventional Coriolis mass flow/density measuring devices can be used for the difference measurement, without significant change, but for a possible adapting to the actual measurement signals and their signal levels. This represents, without doubt, also a significant cost advantage.

Since the measurement pickup must be connected to the associated measuring and operating electronics and this is, as already mentioned, accommodated in the electronics housing, if necessary, arranged directly on the measurement pickup, so that a functionally capable, compact, inline measuring device results, there is finally provided in the support system 30 of the first variant of the invention, opposite the vertex arcuate segments of the measuring tubes and, consequently also opposite the vertex frame segment 35, an, especially medium-tight and pressure-tight, feed-through of a plurality of electrical lines. The feed-through includes a flange 90 secured to the support system 30, for example by means of a welded connection. Flange 90 serves for holding the electronics housing 40, shown only in FIG. 1. Flange 90 has a bore 91, so that the feed-through is accessible from outside of the pickup housing during the assembly. The feed-through further includes a circuit board 96 secured to the support system 30 by means of an angle bracket 95 and extending between the support system and the vertex arcuate segments toward such segments. Thereon are arranged conductive traces, compare the conductive trace 97, which are only visible in FIG. 3. To, in each case, one of these conductive traces, and, thus, to the separate lines of the feed-through 500, are connected connection lines 63, 64 of the exciter mechanism 60, connection lines 73, 74, 75, 76 of the sensor arrangement 70, and connection lines 83, 84 of a first temperature sensor 81 and a second temperature sensor 82. The connection lines 63, 64, 73, 74, 75, 76, 83, 84 are only visible in FIG. 3. Additionally provided is a conductive trace SN for a circuit zero point, this being fixed to the metal holder 95 via metal securement means connected mechanically and, therefore, also electrically, therewith. The, especially in the form of a platinum resistor, temperature sensor 81 (only visible in FIGS. 3 and 4) can, for example, be secured on the one of the in-/outlet arcuate segments of the measuring tube 1, e.g. by adhesive. In like manner, the temperature sensor 82 can be applied to one of the in-/outlet arcuate segments of the measuring tube 3. The temperature sensors 81, 82 serve, as mentioned above, for measuring the instantaneous temperature of, respectively, the media $M_1$, $M_2$. However, it is also possible to arrange a temperature sensor in the measurement pickup, for example, on a node plate, or connection disk, to be described in more detail below, connecting the first and third measuring tubes, in which case the sensor measures an average temperature influenced by the two media $M_1$, $M_2$. As a result, it can then be possible to omit the measurement of a second temperature for the measuring tubes.

As can be seen from FIG. 3, the aforementioned feed-through additionally includes a slit in the feed-through frame segment 33, through which circuit board 96 extends, into the flange 90, with a sufficient spacing being maintained between circuit board 96 and slit 361 to assure electrical isolation. Additionally, the circuit board 96 extends through a washer 362 of insulating material lying on the bore-side of the feed-through frame segment 33. An insulating pottant fills a part of the bore 91 lying above the washer 362 completely, with the pottant 363 even penetrating more or less into the space between the circuit board 96 and the inner wall of the slit 361. Alternatively to an electronics housing 40 fixed directly on the support system 30, it is also possible to use such a housing for the operating and evaluating electronics to be connected, but differing in that the housing is arranged remotely from the measurement pickup and connected therewith via an appropriate connection cable.

According to an embodiment of the invention, for the fine tuning of their mechanical eigenfrequencies and/or for the lessening of vibrations possibly coupled to the exterior of the measurement pickup, the measuring tubes 1, 2, 3, 4 are connected mechanically together by means of a first node plate 51 in the vicinity of a location where the pertinent first in-/outlet tube segment transitions into the pertinent first in-/outlet arcuate segment and by means of a second node plate 52 in the vicinity of a location where the pertinent first in-/outlet arcuate segment transitions into the pertinent first middle tube segment. In a further development of the invention, the measuring tubes 1, 2, 3, 4 are further connected mechanically together by means of a third node plate 53 in the vicinity of a location where the pertinent second in-/outlet tube segment transitions into the pertinent second in-/outlet arcuate segment and by means of a fourth node plate 54 in the vicinity of a location where the pertinent second in-/outlet arcuate segment transitions into the pertinent second middle tube segment. The four node places 51, 52, 53, 54 can be, for example, thin disks, especially of the same material as the measuring tubes. These disks are provided with bores, whose inner diameters correspond about to the outer diameters of the measuring tubes 1, 2, 3, 4, and with slits, so that the disks can first be pushed onto the measuring tubes and then brazed; in such case, also the slits are brazed shut, so that the disks then sit unslitted on the measuring tubes 1, 2, 3, 4.

Figure 7:
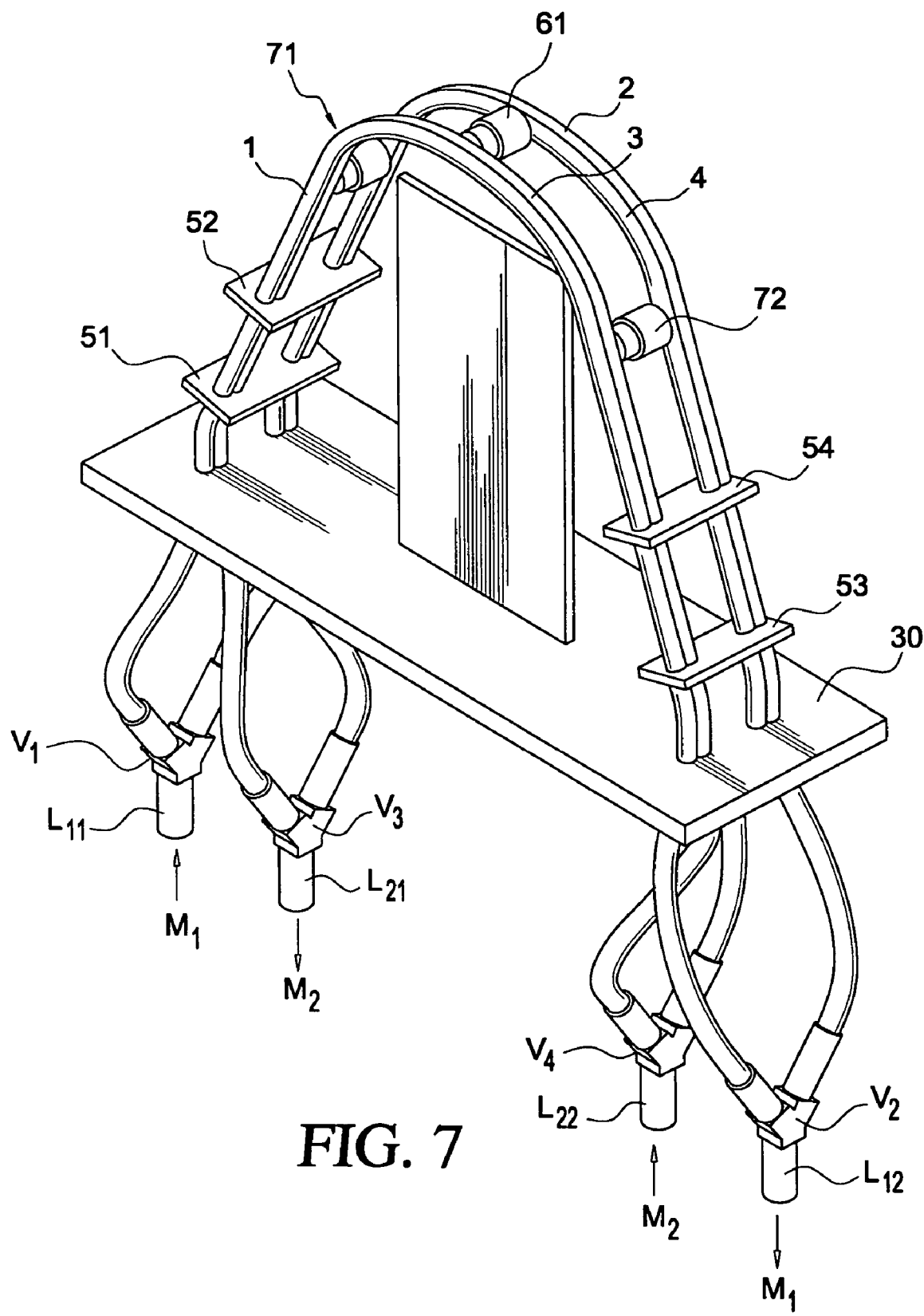
FIG. 7 shows, in a first perspective view, mechanical details of a second variant of a vibration-type measurement pickup suited for an inline measuring device according to FIG. 1.
Figure 8:
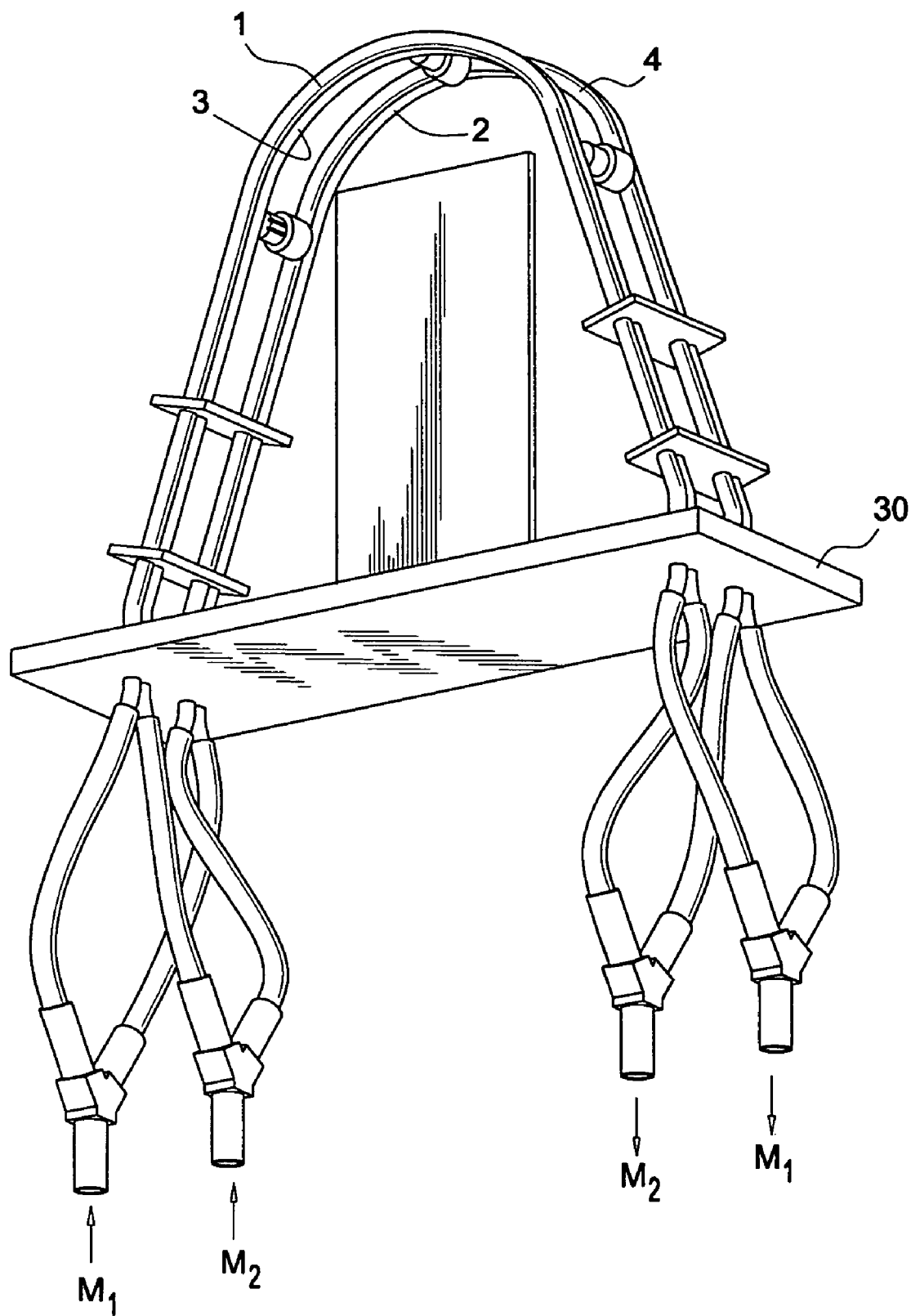
FIG. 8 shows, in a second perspective view, the measurement pickup of FIG. 7.

In a further embodiment of the invention, the measuring tubes 1, 2, both in the case of the measurement pickup of FIGS. 2 and 3, and in the case of the measurement pickup shown in FIGS. 7 and 8, are caused by the exciter mechanism 60 to execute tuning-fork-type, bending oscillations, so-called cantilever oscillations. In contrast, the measuring tubes 1, 2 in the case of the measurement pickup of the third variant are caused to execute bending oscillations which are essentially coplanar, thus in a common plane of oscillation. Additionally provided is that also the third and fourth measuring tubes 3, 4 are each caused to oscillate in the specified manner.

The oscillations excited by the exciter mechanism 60 during operation have, according to a further embodiment of the invention, additionally an oscillation frequency, which is approximately equal to, or at least in the vicinity of, a mechanical eigenfrequency of a mechanical oscillation system including the four measuring tubes. As a result of this, on the one hand, the instantaneously required electrical power for maintaining the oscillations can be minimized. On the other hand, in this way, also an average density of the two media $M_1$, $M_2$ is easily determinable on the basis of the excited oscillation frequency. Beyond this, it is provided that the measuring tubes 1, 2, 3, 4, which are caused to oscillate with essentially equal frequencies, are excited such that, at least in the case of non-flowing media $M_1$, $M_2$, the first and third measuring tubes oscillate essentially synchronously to one another, i.e. with essentially equal forms of oscillation, at essentially equal phase positions and about equal oscillation amplitudes. In analogous manner thereto, in this embodiment of the invention, also the second and fourth measuring tubes 2, 4 are also caused to oscillate essentially synchronously to one another.

For minimizing the technical complexity required with respect to the design of the exciter mechanism 60 and the sensor arrangement 70, on the one hand, and also, on the other hand, for improving the accuracy of measurement, especially also the zero-point stability, a further development of the invention provides that the first and the third measuring tubes 1, 3 are, in each case away from their first and second in-/outlet ends, as well as away from the possibly present node plates 51, 52, 53, 54, essentially rigidly coupled together, at least at points, such that both, possibly sectionally mutually contacting, measuring tubes 1, 3 act as a joint, first oscillation system, by the formation of a first measuring tube combination including the two measuring tubes 1, 3, but not the two measuring tubes 2, 4. Stated differently, the two measuring tubes 1, 3 are connected together within the range executing the wanted oscillations during operation in a manner such that their above-mentioned synchronous oscillation is practically mechanically compelled. The mechanical coupling of the two measuring tubes 1, 3 can, for example, be accomplished, in turn, by means of connecting elements $VS_1$, $VS_2$, $VS_3$ in the form, for example, of thin disks or plates, simple clamping blocks, or the like, which are fixed separated from one another on the two measuring tubes 1, 3 in suitable manner, e.g. by brazing, welding or screwed connection. The connecting disks can, in such case, as also indicated in FIG. 2 or 3, be arranged e.g. at the height, or at least in the vicinity of, the oscillation sensors 71, 72 and/or at the height, or in the vicinity, of the oscillation exciter 61. In analogous manner thereto, in this further development of the invention, also the second and fourth measuring tubes 2, 4 are, in each case away from their first and second in-/outlet ends, essentially rigidly coupled together, at least at points, to form a second measuring tube combination including only these two, possibly sectionally mutually contacting, measuring tubes 2, 4 acting as a joint, second oscillation system. Also for this purpose, again simple connection elements $VS_4$, $VS_5$, $VS_6$ can be arranged and fixed to the two measuring tubes 2, 4 in the previously described manner. Alternatively to, or in supplementation of, the connecting disks, the mechanical coupling serving to form the first or the second measuring tube combination can also be constructed such that the relevant measuring tubes 1, 3, or 2, 4, in each case away from their first and second in-/outlet ends, are essentially rigidly coupled together continuously over a greater section.

In an embodiment of this further development of the invention, the measuring tubes are so formed and mechanically coupled together, that the first oscillation system formed by the first and third measuring tubes 1, 3 and the second oscillation system formed by the second and fourth measuring tubes 2, 4 have essentially the same mechanical eigenfrequencies.

In a further embodiment, the measuring tubes, driven by the exciter mechanism 60, are caused to oscillate during operation with essentially the same oscillation frequency, especially a common, natural eigenfrequency of the first and second oscillation systems. Preferably, the oscillations of the two measuring tube combinations are developed such that vibrations executed during operation by the measuring tubes are, at least at times, bending oscillations about, in each case, an oscillation axis imaginarily connecting, in each case, the first in-/outlet end and the second in-outlet end associated therewith, or an imaginary oscillation axis essentially parallel therewith. Advantageously, the oscillations of the first and second oscillation systems are, in such case, developed such that the first and the second measuring tubes oscillate at least at times with essentially opposite phase relative to one another, thus with a mutual phase-shift of about 180°, and also the third and fourth measuring tubes oscillate, at least at times, with essentially opposite phase relative to one another, while, at the same time, the measuring tubes belonging to the same measuring tube combination, thus the first and the third measuring tube 1, 3, and the second and the fourth measuring tube 2, 4 oscillate, at least in the case of media at rest, each with essentially the same phase as the other. In case necessary, the two measuring tube combinations can, however, also, at times, be caused to oscillate in-phase, thus with a mutual phase shift of about zero, for example for the purpose of direct measurement of a total mass flow rate of the two media $M_1$, $M_2$.

Figure 9:
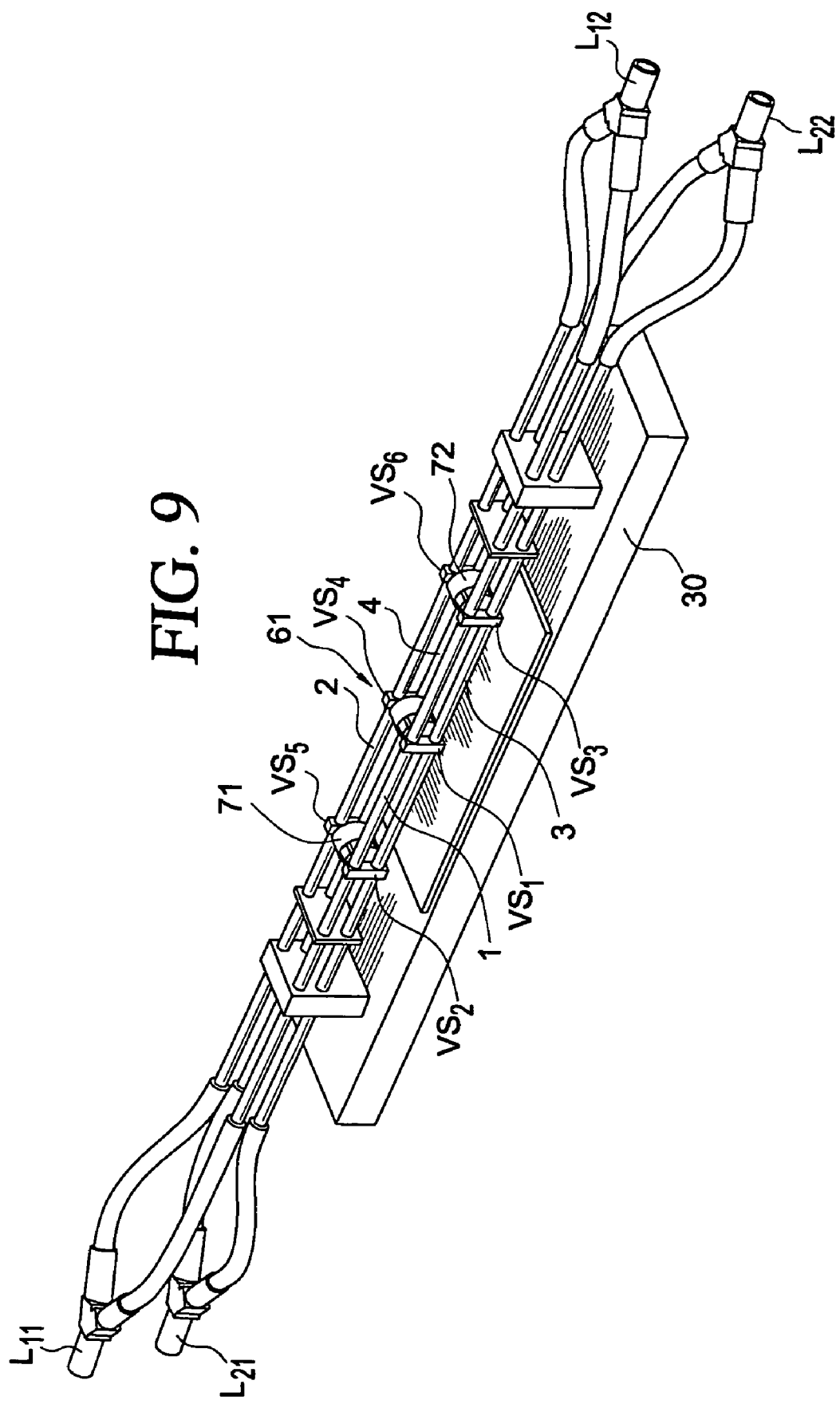
FIG. 9 shows, perspectively, mechanical details of a third variant of a vibration-type measurement pickup suited for an inline measuring device according to FIG. 1.

As illustrated in FIG. 2, the oscillation exciter 61, in the case of the first variant of the measurement pickup, is arranged above the first and second measuring tubes and then also above a common, local center of gravity of all four measuring tubes lying in an imaginary cross sectional plane passing through the installation location of the oscillation exciter 61. In contrast thereto, the oscillation exciter 61, both in the case of the second variant of the measurement pickup shown in FIGS. 7 and 8 and in the case of the third variant shown in FIG. 9, is arranged about at the height of the aforementioned, common center of gravity, so that then the exciting force introduced by the oscillation exciter 61 into the measuring tubes 1, 2, 3, 4 acts in each case essentially in a common center of gravity of the first and third measuring tubes 1, 3 and in a common center of gravity of the second and fourth measuring tubes 2, 4. It is, however, to be noted expressly here, that, of course, also in the case of the arrangement of the measuring tubes according to the first variant shown in FIG. 2, thus with pairs of superimposed, curved measuring tubes, the oscillation exciter can be so arranged with respect to the measuring tubes and fixed thereto, that also the exciting force then introduced by the oscillation exciter into the measuring tubes can act, in each case, essentially in a common, local center of gravity of the first and third measuring tubes and in a common, local center of gravity of the second and fourth measuring tubes. Conversely, however, also in the case of the arrangements of the measuring tubes according to the second or third variants of the measurement pickup, the corresponding oscillation exciter can be arranged outside of the common center of gravity of the measuring tubes. This has, especially in the case of the measuring tube arrangement shown in the third variant of the measurement pickup, the advantage, that, in addition to the bending oscillations, wanted torsional oscillations can be excited, whereby, in the medium instantaneously present in each measuring tube, frictional, or shear, forces, mainly dependent in significant degree on the viscosity, can be induced. These forces, in turn, react to damp the oscillations of the measuring tubes, and this is measurable. Derivable therefrom, at least an average viscosity of the two media $M_1$, $M_2$ can be determined on the basis of the oscillation measurement signals and/or on the basis of the exciter current fed into the exciter arrangement 60.

The forming of the two measuring tube combinations in the described manner has, additionally, the advantage that the four measuring tubes are reduced to two oscillation systems, each of which behaves practically as a single measuring tube, since the exciting forces produced from the one oscillation exciter 61 act, because of the mechanical coupling, both between the first and the second measuring tubes 1, 2 and, also equally, between the third and fourth measuring tubes 3, 4, and also the reaction forces caused in the media for the purpose of measurement, in each case, superimpose on one another, in each case via the mutually coupled measuring tubes of the separate measuring tube combinations and so are transmitted together to the oscillation sensors. Additionally, in advantageous manner, possible differences between the two media, e.g. in mass flow rate, temperature and/or density, etc. are transmitted equally to the first and also to the second oscillation system essentially identical thereto, whereby, in turn, a mutual compensation of potential measurement inaccuracies can be accomplished directly, in very simple manner, in the measurement pickup. Equally, by the coupling of the measuring tubes to measuring tube combinations of the described kind, also a possible asynchronous oscillation of the measuring tubes 1, 3 and 2, 4 can be effectively prevented in the case of non-flowing media $M_1$, $M_2$, whereby, in turn, it can be assured, that asynchronous oscillations of the measuring tubes 1, 3, or 2, 4, arising during operation and showing up as a corresponding phase shift between the two oscillation measurement signals s1, s2, result predominantly from the difference to be measured between the mass flow rates of the two media $M_1$, $M_2$.

A further advantage of the mechanical coupling in the above-described manner is also that each of the so-formed measuring tube combinations acts both for the exciter mechanism 60, as also for the sensor arrangement 70, practically as a single measuring tube, and thus also for the measuring and operating electronics. This leads, in turn, to the fact that, at least for the measuring signal pre-processing and possible digitizing of the same, proven signal processing technologies, including proven, especially two-channel, measuring circuits from the field of Coriolis mass flow rate measurement, processing oscillation measurement signals delivered from only two oscillation sensors, can be utilized. Equally, consequently also for the operating circuit driving the exciter, exciter circuits can be used, which are immediately familiar to those skilled in the art, especially one-channel exciter circuits delivering, thus, an exciter current for a single exciter. It is to be noted at this point additionally that, especially in the case of omission of the above-described mechanical coupling of the measuring tubes 1, 2, 3, 4 for forming the first and second oscillation systems, other oscillation exciters can be provided in addition to the first oscillation exciter, especially oscillation exciters acting solely on the third and fourth measuring tubes 3, 4. In like manner, other oscillation sensors can be provided, especially oscillation sensors registering only oscillations of the third and fourth measuring tubes 3, 4.

In the first variant of the measurement pickup of the invention, in which the first measuring tube 1 is arranged against the third measuring tube 3 and the second measuring tube 2 against the fourth measuring tube 4, in the manner shown in FIGS. 2 and 3, so that they extend essentially parallel to one another, the measurement pickup has an imaginary—here essentially planar—first cutting surface, which cuts the first and third measuring tubes such that, extending therein, are both the centerline of the first measuring tube 1 and also the centerline of the third measuring tube 3. Additionally, the measurement pickup also has an imaginary—here likewise essentially planar—second cutting surface, which cuts the second and the fourth measuring tubes such that their two centerlines extend together therein. Beyond this, the measuring tubes of this embodiment are preferably so arranged in the measurement pickup that these two, especially planar, cutting surfaces are oriented essentially parallel to one another. This means that the third and fourth measuring tubes 3, 4 are, however, each somewhat larger than the first and second measuring tubes 1, 2. In contrast thereto, both in the case of the second variant of the measurement pickup shown in FIGS. 7 and 8, with likewise curved measuring tubes, whose respective centerlines are, however, distributed on four, essentially mutually parallel, imaginary, especially planar, cutting surfaces, as well as in the case of the third variant shown in FIG. 9 with straight measuring tubes, all measuring tubes are not only of essentially equal shape, but are also of essentially equal size.

In a further embodiment, especially of the second or third variant, of the invention, the measuring tubes are, additionally, so formed and arranged in the measurement pickup, that a minimum lateral separation between the first and second measuring tubes is essentially greater than a maximum lateral separation between the first and the third measuring tubes and/or a maximum lateral separation between the second and the fourth measuring tubes. Very advantageous—on the one hand, with respect to manufacture and, on the other hand, however also with respect to the achievable accuracy of measurement—is, in this case, further when the measuring tubes are arranged in the measurement pickup such that the first and the third measuring tubes at least sectionally contact one another and the second and fourth measuring tubes at least sectionally touch one another, whereby an equalizing of temperature between the measuring tubes 1, 3, and 2, 4 is favored. Especially simple and cost-favorable for manufacture of the measurement pickup of the invention, besides favoring good reproducibility, is when the first and third measuring tubes 1, 3 not only contact one another in the above-described manner, in each case away from their first and second in-/outlet ends, but, in fact, are soldered, especially hard-soldered, or brazed, and/or welded together, such that a connecting seam is formed between them, and when the second and fourth measuring tubes 2, 4 are, again remotely from their first and second in-/outlet ends, likewise soldered, especially hard-soldered, or brazed, and/or welded together, such that a connecting seam is formed between them.

Finally, a further embodiment of the invention provides that the support system 30 is held, especially likewise oscillatably, by an external, supporting framework, especially a framework housing the entire inline measuring device, and/or by at least one of the connected medium-lines, especially for the case, that such medium-line is formed as an essentially rigid pipeline.

The invention claimed is:

1. A measurement pickup of the vibration-type for the measurement of a flowable media said measurement pickup, comprising:
   for conveying media to be measured a first measuring tube, a second measuring tube, a third measuring tube and at least a fourth measuring tube, each of said measuring tubes showing a first and a second in-/outlet end and vibrating at least at times, during operation;
   an electromechanical, exciter mechanism for effecting vibration of said measuring tubes; and
   a sensor arrangement reacting at least to local vibrations of said measuring tubes for producing at least one measurement signal influenced by vibrations of at least one of said measuring tubes; wherein:
   the first in-/outlet end of each of said first and second measuring tubes is connected during operation with a first distributor element and the second in-/outlet end of each of said first and second measuring tubes is connected during operation with a second distributor element,
   the first in-/outlet end of each of said third and fourth measuring tubes is connected during operation with a third distributor element, and the second in-/outlet end of each of said third and fourth measuring tubes is connected during operation with a fourth distributor element,
   said first distributor element is connected to a first line segment of the first medium-line conveying a medium to said measurement pickup,
   the second distributor element is connected to a second line segment of the first medium-line conveying a medium away from said measurement pickup,
   the third distributor element is connected to a first line segment of the second medium-line conveying a medium to said measurement pickup, and the fourth distributor element is connected to a second line segment conveying a medium away from said measurement pickup, and
   the fourth distributor element is connected to a second line segment conveying a medium away from said measurement pickup.

2. The measurement pickup as claimed in claim 1, wherein:
   said oscillation exciter is located above a common, local center of gravity of all four measuring tubes, which lies in an imaginary, cross-sectional plane passing through the location of installation of said oscillation exciter.

3. The measurement pickup as claimed in claim 1, wherein:
   said oscillation exciter is so arranged in said measurement pickup and attached to said measuring tubes, that an exciting force introduced into said measuring tubes by the oscillation exciter acts, in each case, essentially in a common, local center of gravity of said first and third measuring tubes and in a common, local center of gravity of said second and fourth measuring tubes, with the two centers of gravity lying in an imaginary cross sectional plane passing through the location of installation of said oscillation exciter.

4. The measurement pickup as claimed in claim 1, wherein:
   said sensor arrangement is constructed as an electrodynamic sensor arrangement, which includes at least two sensor coils of essentially the same construction as said exciter coil of the exciter mechanism, as well as two plunger armatures of essentially the same construction as the plunger armature of said exciter mechanism.

5. The measurement pickup as claimed in claim 1, wherein:
said sensor arrangement includes exactly two sensor coils, as well as exactly two plunger armatures therefor.

6. The measurement pickup as claimed in claim 1, further comprising:
a first support system for the oscillatable holding of said measuring tubes, wherein:
said first support system is fixed to at least one, first in-/outlet end of one of said four measuring tubes and to at least one, second in-/outlet end of one of said four measuring tubes.

7. The measurement pickup as claimed in claim 6, wherein:
said first support system is fixed to the first and to the second in-/outlet ends of at least two of said four measuring tubes.

8. The measurement pickup as claimed in claim 6, wherein:
said first support system is held oscillatably by an external, second support system, and/or by at least one of the connected medium-lines.

9. The measurement pickup as claimed in claim 1, wherein:
said measuring tubes are so formed and arranged in the measurement pickup, that a minimum lateral separation between said first and said second measuring tubes is essentially greater than a maximum lateral separation between said first and said third measuring tubes and/or than a maximum lateral separation between said second and said fourth measuring tubes.

10. The measurement pickup as claimed in claim 1, wherein:
said measuring tubes are so formed and arranged in the measurement pickup that they extend, at least sectionally, essentially parallel to one another.

11. The measurement pickup as claimed in claim 1, wherein:
said first and the third measuring tubes contact one another at least sectionally and in which said second and said fourth measuring tubes contact one another at least sectionally.

12. The measurement pickup as claimed in claim 1, wherein:
said first and third measuring tubes are, for the formation of a first measuring tube combination, essentially rigidly coupled together, at least pointwise, in each case away from their first and second in-/outlet ends, and
said second and fourth measuring tubes are, for the formation of a second measuring tube combination, essentially rigidly coupled together, at least pointwise, in each case away from their first and second in-/outlet ends.

13. The measurement pickup as claimed in claim 12, wherein:
a first oscillation system formed by said first and said third measuring tubes, and a second oscillation system formed by said second and said fourth measuring tubes, show essentially equal eigenfrequencies.

14. The measurement pickup as claimed in claim 1, wherein:
said measuring tubes oscillate during operation with essentially the same oscillation frequency.

15. The measurement pickup as claimed in claim 14, wherein:
said measuring tubes oscillate during operation at a natural eigenfrequency of the first and second oscillation systems.

16. The measurement pickup as claimed in claim 1, wherein:
said first and the second measuring tubes oscillate at least at times with essentially opposite phase relative to one another, and
said third and said fourth measuring tubes oscillate at least at times with essentially opposite phase relative to one another.

17. The measurement pickup as claimed in claim 1, wherein:
the vibrations executed by said measuring tubes during operation are, at least at times, bending oscillations in each case about an axis imaginarily connecting the first and, in each case, the associated second, in-/outlet ends or an imaginary axis parallel to such.

18. The measurement pickup as claimed in claim 1, wherein:
each of said four measuring tubes has a centerline imaginarily connecting its first in-/outlet end and its second in-/outlet end.

19. The measurement pickup as claimed in claim 18, wherein:
said measuring tubes are so formed and arranged in the measurement pickup, that at least two of the four imaginary centerlines run in a common, imaginary, cutting surface of the measurement pickup.

20. The measurement pickup as claimed in claim 18, wherein:
said measuring tubes are so formed and arranged in the measurement pickup that the four imaginary center lines are distributed on two imaginary, essentially mutually parallel, cutting surfaces of the measurement pickup.

21. The measurement pickup as claimed in claim 18, wherein:
said measuring tubes are so formed and arranged in the measurement pickup, that the four imaginary center lines are distributed on four imaginary, essentially mutually parallel, cutting surfaces of the measurement pickup.

22. The measurement pickup as claimed in claim 18, wherein:
said measuring tubes are so formed and arranged in the measurement pickup, that all four imaginary center lines run in a common, imaginary, cutting surface of the measurement pickup.

23. The measurement pickup as claimed in claim 1, wherein:
said four measuring tubes are essentially straight.

24. The measurement pickup as claimed in claim 1, wherein:
said four measuring tubes are essentially identically formed.

25. The measurement pickup as claimed in claim 1, wherein:
of the at least four measuring tubes, said first and second measuring tubes are, at least at times, inserted into the course of a first medium-line in a manner such that each of said first and second measuring tubes simultaneously conveys a partial volume of a medium flowing through the first medium-line of said at least four measuring tubes, said third and fourth measuring tubes are, at least at times, inserted into the course of a second medium-line in a manner such that each of said third and fourth measuring tubes simultaneously conveys a partial volume of a medium flowing through the second medium-line; and the partial volumes of the medium of the first medium-line have, in said first and second measuring tubes, a common flow direction, which, at least at times, is oppositely directed to a common flow direction of the partial volumes of the medium of the second medium-line in said third and fourth measuring tubes.

26. The measurement pickup as claimed in claim 1, wherein:

of the at least four measuring tubes, said first and second measuring tubes are, at least at times, inserted into the course of a first medium-line in a manner such that each of said first and second measuring tubes simultaneously conveys a partial volume of a medium flowing through the first medium-line of said at least four measuring tubes, said third and fourth measuring tubes are, at least at times, inserted into the course of a second medium-line in a manner such that each of said third and fourth measuring tubes simultaneously conveys a partial volume of a medium flowing through the second medium-line; and partial volumes of the medium of the first medium-line have, in said first and second measuring tubes, a common flow direction, which, at least at times is equally directed to a common flow direction of the partial volumes of the medium of the second medium-line in said third and fourth measuring tubes.

27. The measurement pickup as claimed in claim 1, further comprising:

at least one temperature sensor thermally coupled with at least one of said measuring tubes and reacting to changes of its measuring tube temperature.

28. The measurement pickup as claimed in claim 1, wherein:

said first support system is held by an external, second support system, which houses the measurement pickup, and/or by at least one of the connected medium-lines.

29. The measurement pickup as claimed in claim 1, wherein:

said exciter mechanism includes an electrodynamic oscillation exciter, which acts on said measuring tubes via an exciter coil essentially rigidly coupled with at least one of said first and third measuring tubes and via a plunger armature plunging into such coil and essentially rigidly coupled with at least one of said second and fourth measuring tubes.

* * * * *